No. 743,334. PATENTED NOV. 3, 1903.
F. ROBINSON.
NUT LOCK.
APPLICATION FILED AUG. 27, 1903.
NO MODEL.

Witnesses:
K. H. Butler
E. E. Potter.

Inventor
F. Robinson
By H. C. Evertts
Attorneys.

THE NORRIS PETERS CO., PHOTO-LITHO., WASHINGTON, D. C.

No. 743,334. Patented November 3, 1903.

UNITED STATES PATENT OFFICE.

FORSTER ROBINSON, OF SISTERSVILLE, WEST VIRGINIA.

NUT-LOCK.

SPECIFICATION forming part of Letters Patent No. 743,334, dated November 3, 1903.

Application filed August 27, 1903. Serial No. 171,003. (No model.)

*To all whom it may concern:*

Be it known that I, FORSTER ROBINSON, a citizen of the United States of America, residing at Sistersville, in the county of Tyler and State of West Virginia, have invented certain new and useful Improvements in Nut-Locks, of which the following is a specification, reference being had therein to the accompanying drawings.

This invention relates to certain new and useful improvements in nut-locks, the invention being particularly adapted for use in connection with nuts employed in effecting a railroad-joint, though the device may be used in various other connections where it is desired to securely lock a nut in its tightened position upon a bolt.

Briefly described, the invention comprises a plate provided with openings to receive bolts and a washer provided with a plurality of concentrically-arranged openings, through which is adapted to be passed a pin for engagement with the slot provided therefor in the plate. I may provide the plate with a right-angular-extending portion to fit underneath the nuts and for engagement by the latter.

In describing the invention in detail reference is had to the accompanying drawings, forming a part of this specification, and wherein like numerals of reference indicate like parts throughout the several views, in which—

Figure 1:
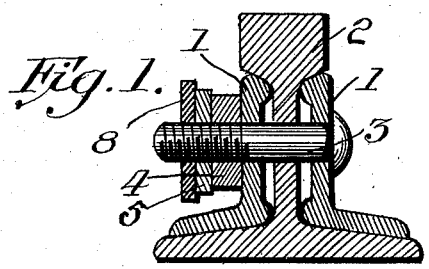
Figure 2:
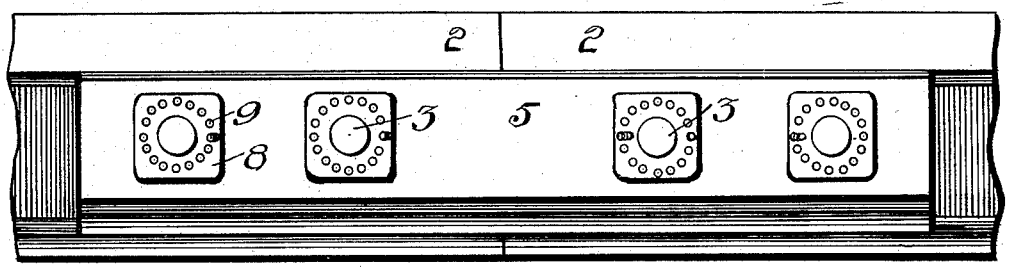
Figure 3:
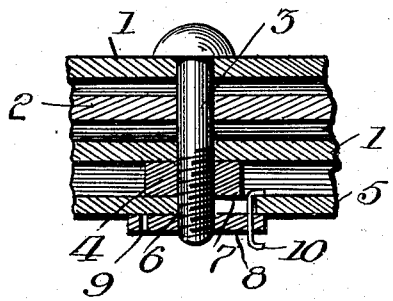
Figure 4:
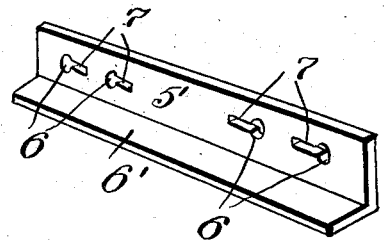

Figure 1 is a transverse vertical sectional view of the nut-lock in position. Fig. 2 is a side elevation. Fig. 3 is a horizontal sectional view, partly broken away. Fig. 4 is a modified form of washer-plate.

By reference to the accompanying drawings it will be observed that the invention is designed especially for the locking together of two or more nuts where they may occur in regular straight-line order—for instance, as in connection with rail-joints. The bolts must be of sufficient length to allow the ends to project beyond the outer face of the nut when the latter is tightened to place.

I have illustrated my invention in connection with a rail-joint, and in the accompanying drawings 1 indicates the fish-plates, 2 the rails, 3 the bolt, and 4 the nut, all of which may be of the ordinary form of construction. On the extending threaded ends of the bolt is placed a washer-plate 5, provided with openings 6 to receive the bolts and having registering slots 7. After the washer-plate has been placed in position the washer 8 is threaded onto the ends of the bolts, this washer being provided with circumferentially-arranged apertures 9, through which is inserted the cotter-pin 10 for engagement in slot 7. I may employ a washer-plate 5', as shown in Fig. 4, which is provided with an inwardly-extending right-angular portion 6', but in other respects is of the same construction as the washer-plate 5. In using the washer-plate of this construction it will be observed that the nuts must be tightened so that the top and bottom of each one must come in direct line. The angle of the plate would itself prevent the turning of the nut, and only two of the apertured washers, one at each end, would need to be used to keep the plate in position. In this construction all the back pressure and strain of the nuts would come on the lower angle of the plate, while where a flat plate is employed this backward pressure of the nuts would be against the apertured washer. I preferably employ the slot 7 in the plate to receive the cotter-pin in lieu of the aperture, as it insures an easier registration with the openings or apertures in the washer 8, and the cotter-pin engaging through the slot outside of the nut 4 will be bent after being inserted, as shown in Fig. 3, so as to securely be retained in position.

In the practice of the invention it will be observed that various slight changes may be made in the details of construction without departing from the general spirit of my invention.

Having fully described my invention, what I claim as new, and desire to secure by Letters Patent, is—

1. In a nut-lock, the combination with the bolts and nuts thereon, of a washer-plate mounted on the bolts against the outer face of the nuts and provided with openings to receive the bolts and having slots registering with said openings, apertured washers threaded on the nuts against the outer face of the washer-plate, and cotter-pins inserted through the apertured washers and washer-plate substantially as and for the purpose described.

2. In a nut-lock, the combination with the bolts and the nuts thereon, of a washer-plate having an inwardly-extending right-angular portion at its lower edge to be engaged by the nuts, said washer-plate having openings to receive the bolts and provided with slots registering with said openings, apertured washers threaded onto the bolts against the washer-plate, and cotter-pins inserted through the apertures in said washers and slots in said plate, as and for the purpose described.

In testimony whereof I affix my signature in the presence of two witnesses.

FORSTER ROBINSON.

Witnesses:
J. L. THOMPSON,
J. G. WOLFE.